US011943513B2

(12) United States Patent
Ohno et al.

(10) Patent No.: US 11,943,513 B2
(45) Date of Patent: Mar. 26, 2024

(54) INFORMATION PROCESSING APPARATUS FOR PRESENTING PREVIEW SCREEN (71) Applicant: Sony Interactive Entertainment Inc., Tokyo (JP)

(72) Inventors: Erika Ohno, Tokyo (JP); Daisuke Kawamura, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/413,710

(22) PCT Filed: Dec. 13, 2019

(86) PCT No.: PCT/JP2019/049032
§ 371 (c)(1),
(2) Date: Jun. 14, 2021

(87) PCT Pub. No.: WO2020/129861
PCT Pub. Date: Jun. 25, 2020

(65) Prior Publication Data
US 2022/0021947 A1    Jan. 20, 2022

(30) Foreign Application Priority Data
Dec. 21, 2018    (JP) ................................. 2018-239689

(51) Int. Cl.
*H04N 21/25*       (2011.01)
*A63F 13/86*       (2014.01)
(Continued)

(52) U.S. Cl.
CPC ......... *H04N 21/4821* (2013.01); *A63F 13/86* (2014.09); *H04N 21/47217* (2013.01)

(58) Field of Classification Search
None
See application file for complete search history.

(56) References Cited

U.S. PATENT DOCUMENTS

2007/0157248 A1* 7/2007 Ellis ................. H04N 21/25891
725/47
2008/0307348 A1* 12/2008 Jones ................. G06F 3/04847
715/772

(Continued)

FOREIGN PATENT DOCUMENTS

JP    2012034793 A    2/2012
JP    2014121610 A    7/2014
(Continued)

OTHER PUBLICATIONS

International Preliminary Report on Patentability and Written Opinion for corresponding PCT Application No. PCT/JP2019/049032, 12 pages, dated Jul. 1, 2021.

(Continued)

*Primary Examiner* — Brian T Pendleton
*Assistant Examiner* — Jean D Saint Cyr
(74) *Attorney, Agent, or Firm* — Matthew B. Dernier, Esq.

(57) ABSTRACT

There is provided an information processing apparatus that presents a user with a content selection screen including a plurality of types of content as content options and that presents the user with, in the case where one of the content options is selected while the content selection screen is presented, a preview screen including a video which represents a state of a screen watched by another user who is actually using the selected content option.

6 Claims, 7 Drawing Sheets

(51) Int. Cl.
  *H04N 21/258* (2011.01)
  *H04N 21/43* (2011.01)
  *H04N 21/431* (2011.01)
  *H04N 21/442* (2011.01)
  *H04N 21/443* (2011.01)
  *H04N 21/466* (2011.01)
  *H04N 21/472* (2011.01)
  *H04N 21/482* (2011.01)
  *H04N 21/8549* (2011.01)

(56) References Cited

U.S. PATENT DOCUMENTS

| | | | | |
|---|---|---|---|---|
| 2010/0017474 | A1* | 1/2010 | Kandekar | H04N 21/4312 709/205 |
| 2010/0095319 | A1* | 4/2010 | Tran | H04N 21/4438 348/E7.003 |
| 2012/0072952 | A1* | 3/2012 | Vaysman | H04N 7/17318 725/40 |
| 2014/0179427 | A1* | 6/2014 | Miura | A63F 13/69 463/31 |
| 2018/0052583 | A1* | 2/2018 | Kim | G06F 3/04815 |
| 2021/0058676 | A1* | 2/2021 | Chai | H04N 21/4312 |

FOREIGN PATENT DOCUMENTS

| | | |
|---|---|---|
| JP | 2016042877 A | 4/2016 |
| WO | 2014100770 A2 | 6/2014 |

OTHER PUBLICATIONS

International Search Report for corresponding PCT Application No. PCT/JP2019/049032, 4 pages, dated Mar. 3, 2020.

Decision to Grant a Patent for corresponding JP Application No. 2020-561387, 4 pages, dated Mar. 29, 2022.

Coconut, "Browser expanded function, Which preview a YouTube animation on the state of thumbnail" The Kadojawa, Inc ASCII research Institute, URL:https://ascii.jp/elem/000/002/615/2615397/>, 2 pages, May 10, 2013 (See Non-Pat. lit #1 for relevancy).

* cited by examiner

INFORMATION PROCESSING APPARATUS FOR PRESENTING PREVIEW SCREEN

TECHNICAL FIELD

The present invention relates to an information processing apparatus, an information processing system, an information processing method, and a program that present content to a user as possible options.

BACKGROUND ART

In an information processing apparatus such as a home gaming console, it is common to provide a user with content selected by the user from a plurality of types of possible options such as games and videos. Such an information processing apparatus displays a list of a plurality of types of content as possible options, for example, and receives a user selection.

SUMMARY

Technical Problem

The information processing apparatus described above may present information related to possible options of content and other information for reference when the user makes a selection. However, such related information basically remains unchanged and may not be sufficient in a situation where the user makes a selection, in some cases.

The present invention has been devised in light of the foregoing, and it is an object of the present invention to provide an information processing apparatus, an information processing system, an information processing method, and a program that allow presentation of information that is more helpful for the user upon making a selection in the case where a plurality of types of content are presented to a user as possible options.

Solution to Problem

An information processing apparatus according to a mode of the present invention includes a content selection screen presentation section and a preview screen presentation section. The content selection screen presentation section presents a user with a content selection screen including a plurality of types of content as content options. The preview screen presentation section presents the user with, in the case where one of the content options is selected while the content selection screen is presented, a preview screen including a video that represents a state of a screen watched by another user who is actually using the selected content option.

An information processing system according to a mode of the present invention includes a server apparatus and a plurality of client apparatuses. The server apparatus includes means adapted to receive, from each of the plurality of client apparatuses, information identifying content currently used by the client apparatus. At least one of the plurality of client apparatuses includes a content selection screen presentation section and a preview screen presentation section. The content selection screen presentation section presents a user with a content selection screen including a plurality of types of content as content options. The preview screen presentation section receives, in the case where one of the content options is selected while the content selection screen is presented, information identifying another user who is actually using the selected content option, from the server apparatus, and presents the user with a preview screen including a video that represents a state of a screen watched by the other user identified by the received information.

An information processing method according to a mode of the present invention includes a step of presenting a user with a content selection screen including a plurality of types of content as content options and a step of presenting the user with, in the case where one of the content options is selected while the content selection screen is presented, a preview screen including a video that represents a state of a screen watched by another user who is actually using the selected content option.

A program according to a mode of the present invention causes a computer to perform a step of presenting a user with a content selection screen including a plurality of types of content as content options and a step of presenting the user with, in the case where one of the content options is selected while the content selection screen is presented, a preview screen including a video that represents a state of a screen watched by another user who is actually using the selected content option. This program may be provided in such a manner as to be stored in a computer-readable non-temporary information storage medium.

DESCRIPTION OF EMBODIMENT

A detailed description of an embodiment of the present invention will be given below with reference to drawings.

Figure 1:
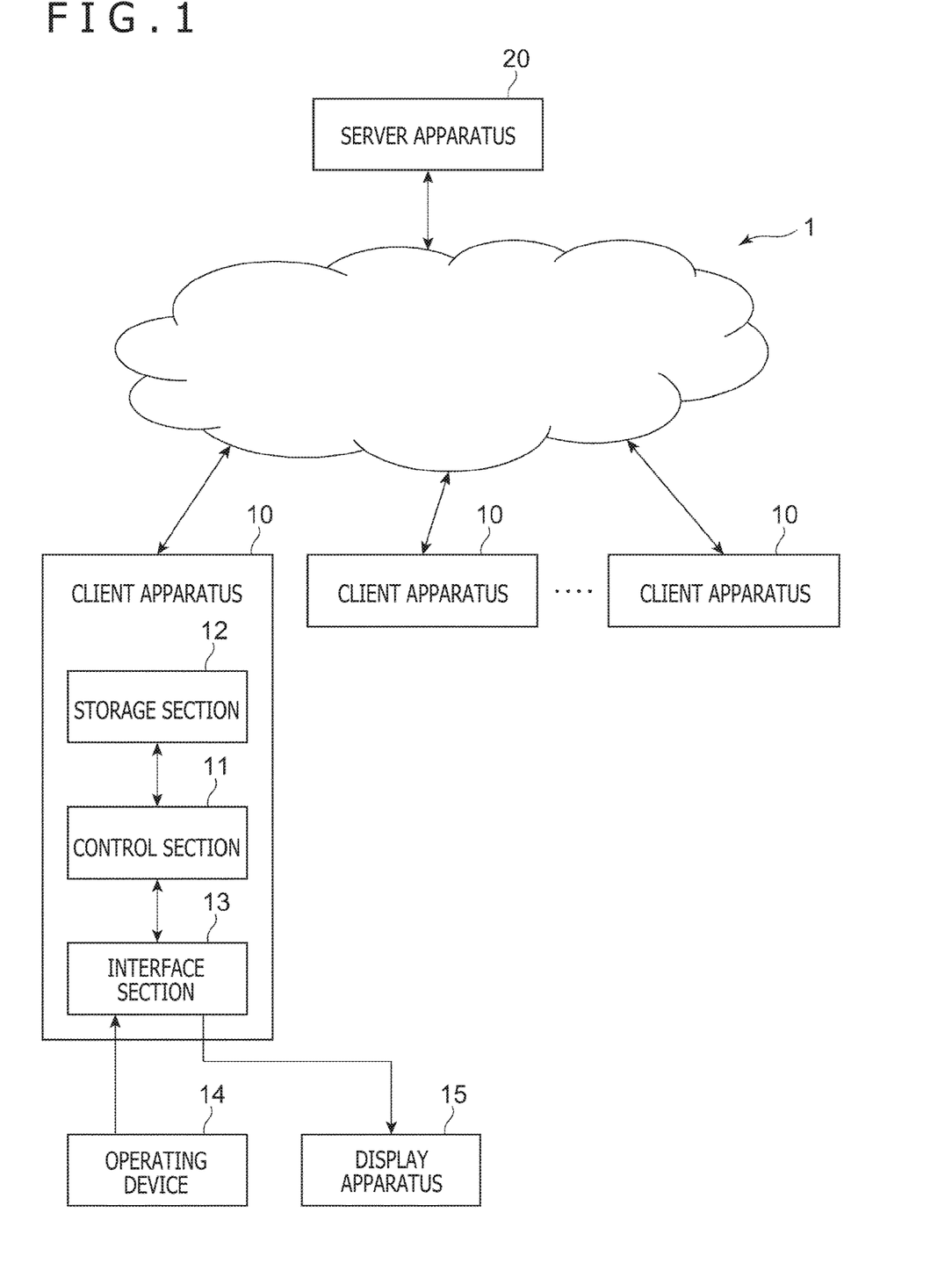
FIG. 1 is a configurational block diagram of an information processing system including client apparatuses that are information processing apparatuses according to an embodiment of the present invention.

FIG. 1 is a configurational block diagram illustrating an overall outline of an information processing system 1 including client apparatuses 10 that are information processing apparatuses according to the embodiment of the present invention. As illustrated in FIG. 1, the information processing system 1 includes the plurality of client apparatuses 10 and a server apparatus 20.

Each of the client apparatuses 10 is, for example, an information processing apparatus such as a home gaming console or a personal computer. As illustrated in FIG. 1, the client apparatus 10 includes a control section 11, a storage section 12, and an interface section 13. Also, the client apparatus 10 is connected to an operating device 14 and a display apparatus 15.

The control section 11 includes at least one processor such as a CPU (Central Processing Unit) and performs a variety of information processing tasks by executing a program stored in the storage section 12. It should be noted that a specific example of a processing task performed by the control section 11 in the present embodiment will be described later. The storage section 12 includes at least one memory device such as a RAM (Random-Access Memory) and stores the program executed by the control section 11 and data processed by the program.

The interface section 13 is an interface for data communication with the operating device 14 and the display apparatus 15. The client apparatus 10 is connected to each of the operating device 14 and the display apparatus 15 in a wired or wireless manner via the interface section 13. Specifically, the interface section 13 includes a multimedia interface such as an HDMI (registered trademark) (High-Definition Multimedia Interface) to send video image data supplied by the client apparatus 10, to the display apparatus 15. Also, the interface section 13 includes a data communication interface such as a USB (Universal Serial Bus) to receive an operation signal indicating details of a user operation received by the operating device 14.

Further, in the present embodiment, the interface section 13 includes a communication interface such as a LAN (Local Area Network) to send and receive data to and from other information processing apparatuses via a communication network such as the Internet. The client apparatus 10 is connected to the other client apparatuses 10 and the server apparatus 20 for communication via this interface section 13.

The operating device 14 is, for example, a dedicated controller of a home gaming console or the like. The operating device 14 receives an operation instruction from the user and sends an operation signal indicating details of the operation instruction to the client apparatus 10.

The display apparatus 15 displays a video image corresponding to a video image signal sent from the client apparatus 10, to let the user view the video image. The display apparatus 15 may be a stationary display apparatus such as a home television receiver. Alternatively, the display apparatus 15 may be a head-mounted display or the like worn by the user on the head.

The server apparatus 20 is a server computer that manages a running status of each client apparatus 10 and that provides the user of each client apparatus 10 with a service realized by the information processing system according to the present embodiment. In the description given below, one of the plurality of client apparatuses 10 will be denoted as a client apparatus 10n, and a user using the client apparatus 10n will be denoted as a featured user Un for reasons of convenience. Then, the user using each of the other client apparatuses 10 will be denoted as another user. Also, users including the featured user Un and the other user and using the service provided by the information processing system 1 will be denoted as service users. A friend relationship may be set between service users. Such setting of a friend relationship is managed by the server apparatus 20 according to registered information of each service user. That is, the server apparatus 20 retains friend relationship setting information indicating with whom each service user is a friend. In the description given below, another user who has a friend relationship with the featured user Un will be denoted as a friend user.

Figure 2:
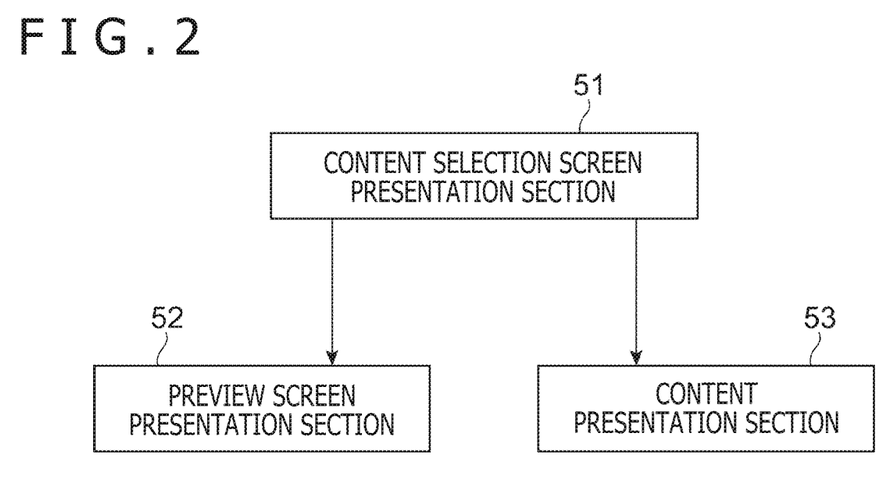
FIG. 2 is a functional block diagram of the client apparatus.

A description of functions realized by the client apparatus 10 will next be given with reference to FIG. 2 by taking the client apparatus 10n as an example. As illustrated in FIG. 2, the client apparatus 10n functionally includes a content selection screen presentation section 51, a preview screen presentation section 52, and a content presentation section 53. These functions are realized as a result of execution of the program stored in the storage section 12 by the control section 11. This program may be provided to the client apparatus 10n via a communication network such as the Internet or in such a manner as to be stored in a computer-readable information storage medium such as an optical disc.

Figure 3:
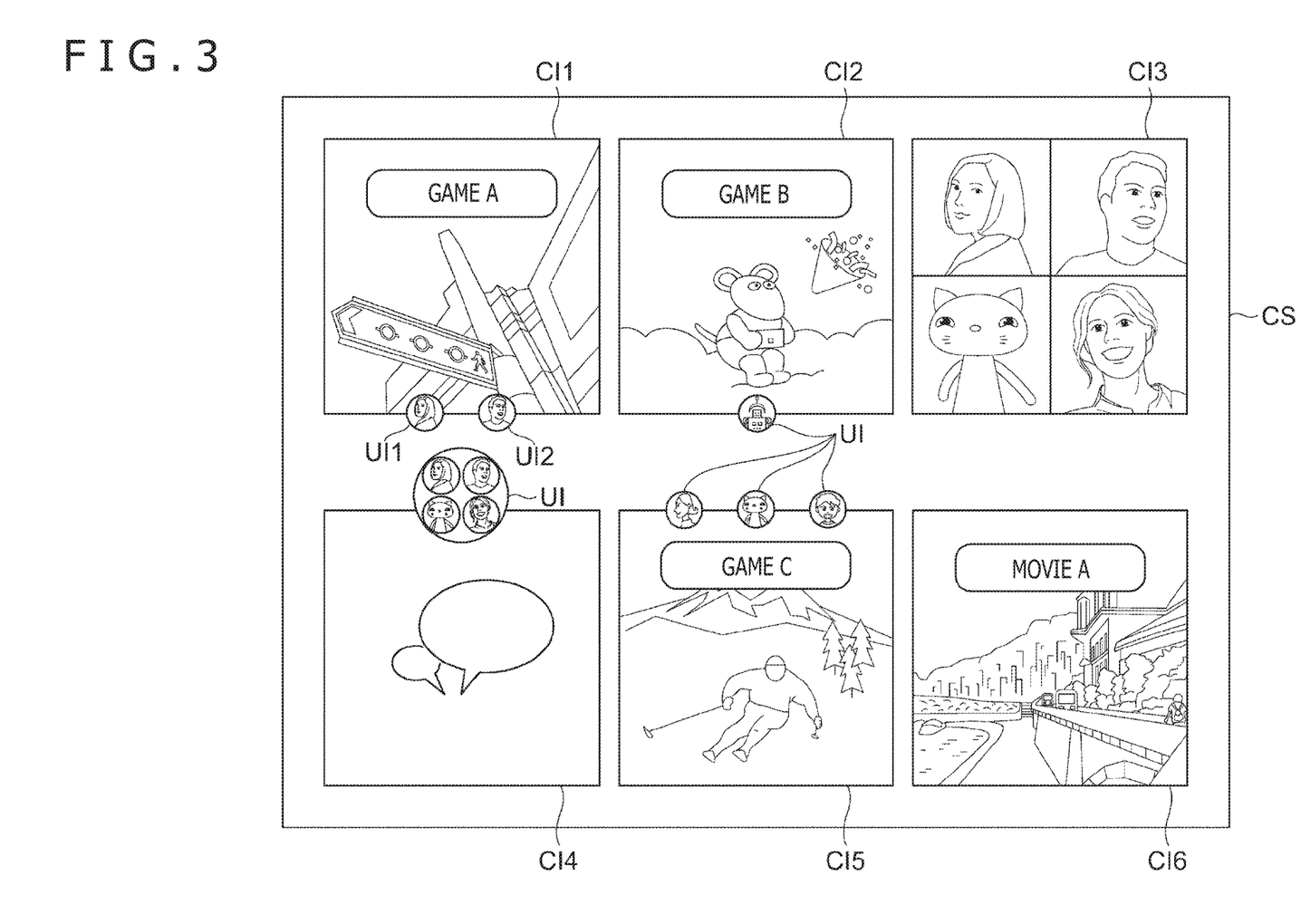
FIG. 3 is a diagram illustrating a display example of a content selection screen.

The content selection screen presentation section 51 draws a content selection screen CS and displays the content selection screen CS in a display region of the display apparatus 15. The content selection screen CS is a screen for allowing the featured user Un to select a plurality of types of content (hereinafter referred to as content options C) that can be provided to the featured user Un by the client apparatus 10n, and includes content images CI representing the respective content options C. The content images CI may be icon images, cover images, and the like. FIG. 3 illustrates an example of the content selection screen CS that includes six content images CI1 to CI6 representing a total of six content options C1 to C6, respectively.

The content options C that are selectable on the content selection screen CS may include a various types of content including, for example, game content that can be played by the featured user Un, video content such as movies, and music content. In addition, content realized by a variety of independent application programs may also be included. Examples of content realized by such application programs include chat content realized by a chat application and message content realized by a message application.

Also, the content options C presented on the content selection screen CS may include information regarding a user group presented by a user group application. A user group is created by any one of service users and is a group of which a plurality of service users are members. The server apparatus 20 manages which service user is a member of which user group. The user group application displays states of other users who are members of a user group in which the featured user Un takes part, and displays a schedule of the group. For example, in the case where a plurality of service users intend to play the same game at the same time together, these service users can share the schedule by becoming members of one user group and registering the schedule with the user group.

In the case where the featured user Un selects any one of the content options C in a state where the content selection screen CS is displayed by the content selection screen presentation section 51, the preview screen presentation section 52 displays a preview screen PS corresponding to the selected content option C. Specifically, the featured user Un selects any one piece of content from the content options C presented as a result of an instruction operation performed on the operating device 14, in a state where the content selection screen CS is displayed in the display region of the display apparatus 15. When any one of the content options C is placed into a selected state, the preview screen presentation section 52 displays the preview screen PS regarding the content option C in a selected state. While viewing a preview of each content option C, the featured user Un selects content which the featured user Un intends to use, and then performs an operation to confirm the selection on the operating device 14. In response to this confirmation operation, the content presentation section 53 executes a program corresponding to the selected content and starts the presentation of the content. It should be noted that details of control realized by the preview screen presentation section 52 will be described later.

The content presentation section 53 executes the program corresponding to the content option C which is confirmed as a final selection by the featured user Un in a state where the content selection screen CS is presented, thus presenting the corresponding content. For example, in the case where game content is selected, the content presentation section 53 executes a corresponding game program. In the case where video or music content is selected, the content presentation section 53 executes a player program that reproduces the selected content. Also, in the case where a user group is selected as the content option C, the content presentation section 53 executes an application program that manages the user group, and presents content including information regarding the user group.

A detailed description of the preview screen PS presented while the content selection screen CS is presented will be given below. First, when presenting the content selection screen CS before the presentation of the preview screen PS by the preview screen presentation section 52, the content selection screen presentation section 51 acquires information regarding another user currently using each piece of content (hereinafter referred to as current user information), thus displaying current user information within the content selection screen CS. For example, in the case where the content option C1 is content of a game A and where users U1 and U2 are currently playing the game A by using their own client apparatuses 10, the content selection screen presentation section 51 displays two user images UI representing these two other users, as current user information in association with the content option C1 of the game A. It should be noted that the user images UI may be avatar images, photograph images, or the like registered by their users in advance. In FIG. 3, such user images UI are arranged side by side at an upper or lower edge of each content image CI. For example, a user image UI1 representing the user U1 and a user image UI2 representing the user U2 are displayed side by side at the lower edge of the content image CI1 representing the content option C1. It should be noted here that each of the user images UI is arranged at a position close to a side of a perimeter of the associated content image CI, the side being closer to the center of the content selection screen CS than the perimeter thereof.

In order to control the display of such current user information, when starting presentation of content, the content presentation section 53 of each client apparatus 10 notifies the server apparatus 20 of information identifying the content whose presentation will be started (e.g., ID (Identification) assigned to content) and information identifying a service user watching the content (e.g., user account). Also, when terminating the presentation of content, the content presentation section 53 notifies the server apparatus 20 of the termination. The server apparatus 20 manages which content is used by which service user at present in each of the client apparatuses 10, by receiving such a notice.

When starting the presentation of the content selection screen CS, the content selection screen presentation section 51 of the client apparatus 10n sends an acquisition request for current user information to the server apparatus 20. This acquisition request includes information identifying the content options C to be included in the content selection screen CS. The server apparatus 20 that has received the acquisition request identifies, for each content option C included in the acquisition request, the service user currently using the content and returns the information to the client apparatus 10n that has sent the request, as current user information. This reply includes at least information identifying a current user currently using each content option C. Further, the reply may include access destination information (e.g., IP (Internet Protocol) address) of the client apparatus 10 used by the current user and data of the user image UI representing the current user. On the basis of the current user information received from the server apparatus 20, the content selection screen presentation section 51 of the client apparatus 10n displays, in association with each of the content options C, the user image UI representing the current user currently using the content option C.

Here, current user information sent from the server apparatus 20 to the client apparatus 10 may include only friend user information of the featured user Un. Alternatively, the current user information may include information regarding other users except friend users. Also, each service user may set, in advance, a disclosure rule such as whether to disclose his or her own current user information only to friend users or to all service users. In such a case, when receiving an acquisition request from each client apparatus 10, the server apparatus 20 narrows down service users who are actually using the content option C for which the acquisition request has been made, to select current users to be included in a reply, on the basis of the disclosure rule and the friend setting of each of the service users. Also, in the case where there are a plurality of service users who are currently using the same content option C, the server apparatus 20 may include, in current user information, only information regarding one user selected according to a given criterion or may send information regarding a plurality of current users. Also, in the case where the content option C is game content and where there are a plurality of friend users who take part in the same session and play the game together, information regarding these friend users may be sent as current user information.

It should be noted that users currently using certain content change over time. Accordingly, while the content selection screen CS is presented, the content selection screen presentation section 51 may repetitively send an acquisition request for current user information to the server apparatus 20 on a regular basis and may update current user information to be displayed, to the latest information every time the content selection screen presentation section 51 sends the acquisition request. Also, as for the content option C such as a chat application, the content selection screen presentation section 51 may display the user image UI representing another user who exchanges messages with the featured user Un, by using the application, instead of information regarding a user currently using the content. Also, as for the content option C of a user group, the user images UI each representing another user who is a member of the user group may be displayed. In the example illustrated in FIG. 3, the content image CI3 representing the content option C3 of a user group includes the user images UI representing other users who are members of the user group.

Thereafter, in the case where the featured user Un selects any one of the content options C while the content selection screen CS is displayed, the preview screen presentation section 52 displays the preview screen PS corresponding to the content option C. At this time, the preview screen presentation section 52 displays the state of the content screen actually watched by the current user associated with the content option C, within the preview screen PS. This allows the featured user Un to view, for example, the state of a game actually being played by another user and select content which the featured user Un intends to use from now. In particular, in the case where, for example, the featured user Un intends to join the game currently played by a friend user, the featured user Un can select desired content by using the preview screen PS described above.

In order to control the display of the preview screen PS described above, in the case where the featured user Un selects one of the content options C, the preview screen presentation section 52 of the client apparatus 10n identifies another user currently using the selected content option C, by referring to current user information received in advance from the server apparatus 20. Then, the preview screen presentation section 52 sends a content delivery request to the client apparatus 10 used by the user. The content presentation section 53 of the client apparatus 10 that has received the content delivery request delivers on a real time basis, to the client apparatus 10n that has sent the request, a video representing the content screen currently displayed in the display region of the display apparatus 15 for presentation to the user of the client apparatus 10. The preview screen presentation section 52 of the client apparatus 10n reproduces the delivered video within the preview screen PS on a real time basis (i.e., in parallel with and at the same time as the reception of the delivered video). Such control allows the featured user Un to watch the content screen actually being watched by another user.

Figure 4:
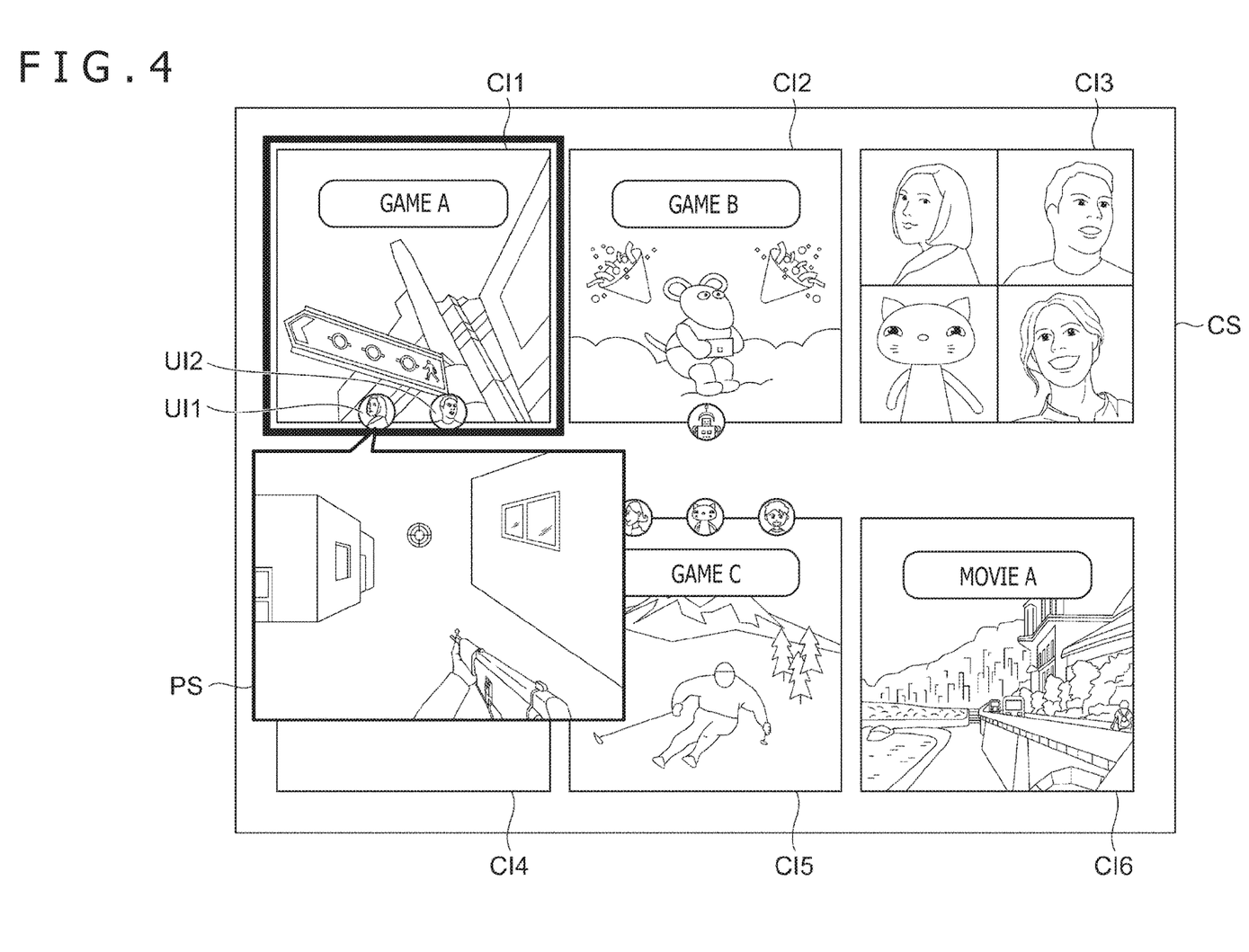
FIG. 4 is a diagram illustrating an example of the content selection screen where a preview screen is displayed.

FIG. 4 illustrates a display example in which the preview screen PS described above is displayed in such a manner as to be superimposed on the content selection screen CS. Here, the preview screen PS is in the form of a speech balloon, pointing to one of the user images UI. This user image UI corresponds to a current user who delivers the video currently presented on the preview screen PS. As described above, it is possible to readily find out to whom the currently displayed video is presented as a content screen, by displaying the preview screen PS in association with the user image UI included in the content selection screen CS.

Figure 5:
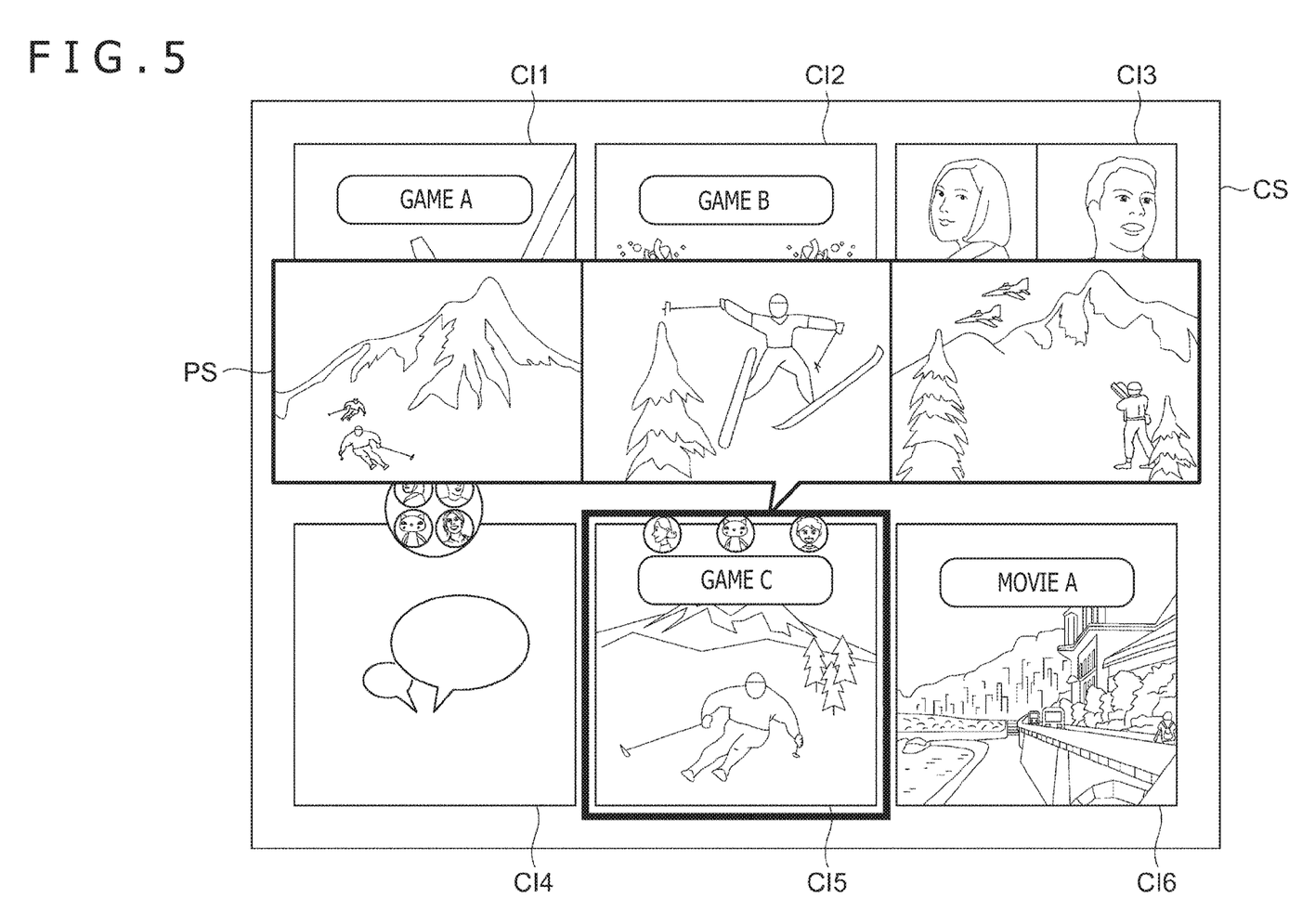
FIG. 5 is a diagram illustrating another example of the content selection screen where the preview screen is displayed.

It should be noted that, in the case where there are a plurality of other users who are currently using the selected content option C, the preview screen presentation section 52 may receive a video representing the content screen currently watched by one of the other users who is selected from the plurality of other users according to a given criterion and may present the video as the preview screen PS. Alternatively, the preview screen presentation section 52 may receive, in parallel, videos representing content screens individually from the plurality of client apparatuses 10 used by the plurality of other users and may present the plurality of videos as the preview screens PS at the same time. FIG. 5 illustrates an example in which a plurality of videos are displayed side by side as described above. In this example, the states of three other users who are playing the same game are displayed simultaneously. It should be noted that, in the example illustrated in FIG. 5, three videos are arranged in order corresponding to that of the three user images UI arranged side by side along an edge portion of the content image CI. As described above, it is possible for the featured user Un to find out which video is presented to whom as a content screen, by displaying the plurality of videos in such a manner as to associate the plurality of videos with corresponding ones of the user images representing the plurality of other users.

As described above, by receiving a video representing a content screen currently watched by another user for display, it is possible for the preview screen presentation section 52 to present the user with a preview of a content screen that can be presented by a program corresponding to the content option C, without directly executing the program by the preview screen presentation section 52. It should be noted that, in the case where the content option C that is not associated with current user information is selected (e.g., in the case where no user is currently using the content option C), the preview screen presentation section 52 may display a video or the like prepared in advance, within the preview screen PS.

What is displayed on the preview screen PS presented by the preview screen presentation section 52 may change depending on the type of the selected content option C. For example, in the case where content that is realized by an application program for interaction with other users, such as a chat application or a message application, is selected, the preview screen presentation section 52 may display, within the preview screen PS, information indicating messages exchanged in the past by using the program, messages not read by the featured user Un, or the like. Also, messages actually posted in a chat room or the like may be displayed on a real time basis. Such information can be acquired from the server apparatus 20 that relays messages.

Figure 6:
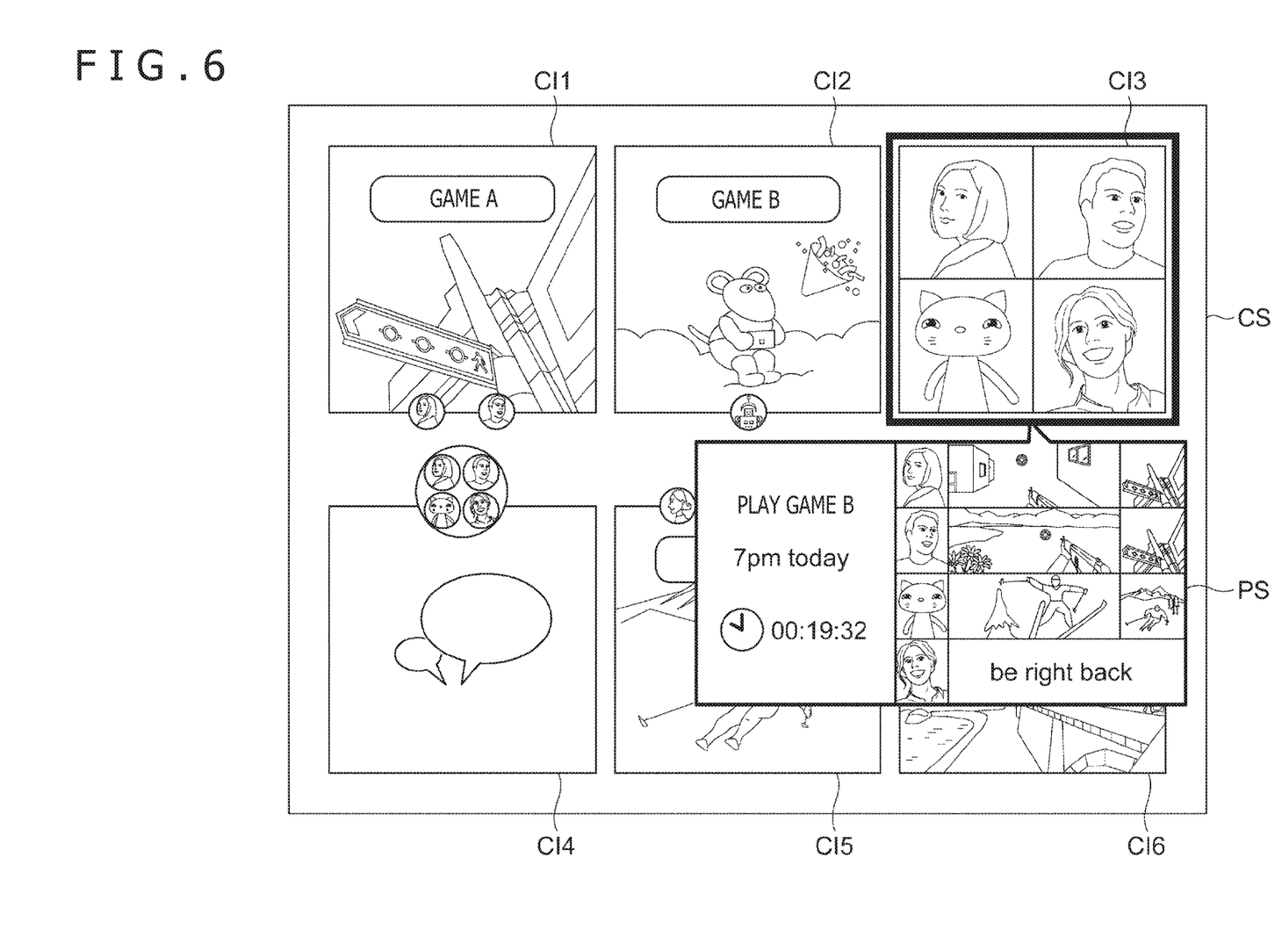
FIG. 6 is a diagram illustrating still another example of the content selection screen where the preview screen is displayed.

Also, in the case where the content option C corresponding to a user group is selected, the preview screen presentation section 52 may present the preview screen PS including information such as current situations of other users who are members of the user group (information regarding content currently used by each of the other users) and a future schedule. Such information can also be received and acquired from the server apparatus 20. FIG. 6 illustrates a display example of the preview screen PS illustrating such a user group status. In FIG. 6, the next schedule set for the user group and the remaining time until the scheduled date and time are displayed on the left on a real time basis. Also, a current status of each of four other users who are members of the user group is illustrated on the right. In particular, as for users currently using some kind of content with the client apparatuses 10, videos representing screens of content viewed by the respective users are displayed side by side as, similarly to the example illustrated in FIG. 5.

Also, while the preview screen PS is displayed, the featured user Un may select whether to start the use of the content by activating a program corresponding to the content by himself or herself or to continue watching the video presented on the preview screen PS. In the case where an operation for selecting the continuation of watching the video presented on the preview screen PS is received, the preview screen presentation section 52 switches what is displayed, to a delivered video viewing mode in which a video currently delivered is displayed over the entire display region of the display apparatus 15. This allows the featured user Un to concentrate on viewing a video representing the state where another user is playing.

In the examples described so far, the content options C presented on the content selection screen CS are those that can be presented by the client apparatus 10n, such as a game program that has already been downloaded to the client apparatus 10n in advance or video data that has already been downloaded. However, the content options C presented on the content selection screen CS are not limited thereto, and the content selection screen presentation section 51 may include, in the content options C, content whose data does not exist in the client apparatus 10n (hereinafter referred to as non-presented content).

For example, there is a possibility that a game played by a friend user, a video watched by the friend user, or the like may capture the attention of the featured user Un. Accordingly, when the content selection screen presentation section 51 sends an acquisition request for current user information to the server apparatus 20, the server apparatus 20 replies not only current user information of the content option C included in the acquisition request but also information identifying non-presented content such as a game actually being used by a friend user of a service user who has made the request (here, service user is featured user Un), in such a manner as to include the information identifying the non-presented content in the current user information. The content selection screen presentation section 51 presents the user with the non-presented content that is currently used by the friend user and that is included in the replied current user information, in such a manner as to be included in the content selection screen CS as one of the content options C. Data of this non-presented content does not exist in the client apparatus 10n. However, by receiving a video delivered from the client apparatus 10 used by the friend user (i.e., video representing a content screen currently presented to the friend user), it is possible for the preview screen presentation section 52 to present the featured user Un with the preview screen PS of the non-presented content in a similar manner to those of the other content options C. In the case where the featured user Un performs a selection confirmation operation for using the non-presented content, the content presentation section 53 performs a preparatory process to allow presentation of the non-presented content to the featured user Un. This preparatory process may be, for example, a process of downloading data of the non-presented content from a provider, a process of displaying a purchase procedure screen for prompting the featured user Un to purchase the non-presented content, or the like. This allows the featured user Un to newly use the non-presented content which has been unavailable up to that point.

It should be noted that, in this example, non-presented content included in current user information provided to the client apparatus 10n by the server apparatus 20 is not limited to content currently used by a friend user and may be content currently used by another user other than a friend user. For example, the server apparatus 20 may present the client apparatus 10n with information regarding non-presented content having a large number of current users at that point, content set in advance as recommended content, or other content, in such a manner as to be included in the current user information.

Also, in the case where the preview screen PS of non-presented content is presented, the preview screen presentation section 52 may present the preview screen PS in a manner different from that for other presentable content. Specifically, it is assumed that non-presented content is not owned by the featured user Un. Therefore, for example, in the case where the non-presented content is a movie or a video, it may not be preferred that the featured user Un continue watching a preview of the content. Accordingly, the preview screen presentation section 52 may impose a predetermined restriction on the presentation of a preview of non-presented content, such as a restriction which limits an amount of time that the featured user Un is allowed to continue watching a preview of content, to equal to or less than a predetermined amount of time, or a restriction which presents a preview at a lower resolution than that of other content. Also, the usage of the delivered video viewing mode described above may be restricted for non-presented content.

In the case where the preview screen presentation section 52 receives a video representing a currently presented content screen from the other client apparatus 10, it may take time to receive the video, and the display may not be started immediately. Further, in the case where the featured user Un gives an instruction to start the usage of non-presented content, the process of downloading data of the non-presented content may also take time. As described above, in the case where a process that requires the user to wait is performed, the client apparatus 10 may give a guidance display for reporting the progress level of the process (hereinafter referred to as a progress guidance display). Specific examples of such a progress guidance display will be described here.

In order to report a progress level of the process that requires the user to wait, it has been common to use a progress guidance display such as a progress bar that changes what is displayed, as needed, as the process proceeds. Further, in addition to the progress guidance display described above, it is common to display a numerical value indicating a progression level of the process, such as a progress rate (ratio), an amount of processing actually completed (e.g., downloaded data size), or estimated remaining time, and update this numerical value as the process proceeds. In the case where such a progress guidance display is given, the client apparatus 10 checks the progression level of the process at relatively short time intervals and performs a process of updating the display if the process proceeds to or beyond a predetermined ratio. According to such a process, it is possible for the user to readily find out, by a progress guidance display, approximately how far the process has proceeded so far and approximately how much more time it will take, for example. However, in the case of a type of progress guidance display that updates what is displayed, as needed, as the process proceeds, if the progression of the process is temporarily delayed, the display may not be updated.

A description of a progress guidance display used in the case where the preview screen presentation section 52 performs a process of receiving delivered video image data from the client apparatus 10 used by another user, will be given as a specific example. When starting the display of the preview screen PS, the preview screen presentation section 52 first receives a volume of delivered video images that allows reproduction for a predetermined time period, and starts the display of the delivered video images after the reception thereof is complete. Then, until the display of the delivered video images is started, the preview screen presentation section 52 gives a progress guidance display indicating the progress status of the data reception process required for the start.

In this example, while a progress guidance display is given, a situation in which a received data volume increases only little by little due to congestion in the communication network, for example, may arise. Here, in the case where the display is updated for each 1% increase in the progress rate of the process (the ratio of received data to an entire data size required to start the display), if it takes a long time to receive data corresponding to 1%, what is displayed in the progress guidance display is not updated for a relatively long time. In such a situation, the user viewing the progress guidance display cannot determine whether the speed at which the process proceeds has simply temporarily slowed down or the process has come to a halt due to an internal error or the like.

Figure 7:
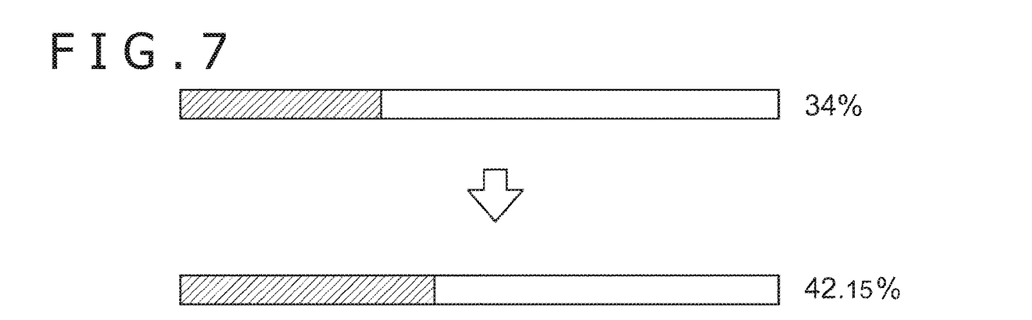
FIG. 7 is a diagram illustrating an example of a progress guidance display.

Accordingly, in the case where a situation where the progress guidance display is not updated for a predetermined reference time period (i.e., the progress level of the process does not increase by a predetermined update threshold or more within the predetermined reference time period) arises, the preview screen presentation section 52 increases the number of displayed digits of the numerical value of the displayed progress level. FIG. 7 is a diagram illustrating an example of such a progress guidance display, and an example of a display in a normal state (before the number of displayed digits is increased) is illustrated at the top, and an example of a display in a slowed-down state (after the number of displayed digits is increased) is illustrated at the bottom. In this example, the numerical value of the progress level is displayed in percentage to ones place in a normal state, and no values to the right of a decimal point are displayed. However, in the case where this display is not updated continuously for a predetermined determination time or more, the preview screen presentation section 52 increases the number of displayed digits of the numerical value of the progress level to a second decimal place as illustrated at the bottom in FIG. 7. If the number of displayed digits increases, the update threshold for updating the numerical value of the progress level also drops (in the example illustrated in FIG. 7, the numerical value is updated if the progress rate increases by 0.01% or more). Accordingly, even in a situation where the processing speed has slowed down and where the progression of the process cannot be expressed by a progress bar, the user can confirm, from the numerical value of the progress level, that the process has not come to a halt and is progressing little by little. On the other hand, in the case where the process has come to a halt, even if the number of displayed digits increases, the situation where the numerical value of the progress rate is not updated continues. Accordingly, by increasing the number of displayed digits of the numerical value of the progress level, it becomes easier for the user to distinguish between a situation where the speed at which the process proceeds has simply slowed down and a situation where the process has come to a halt.

In this display example, the number of displayed digits of the numerical value is not increased until a situation where the numerical value is not updated for a predetermined reference time period arises. The reason for this is that, while the process proceeds at a normal speed, the numbers in low places are updated at a speed that does not permit distinction by the user, and that the user is less likely to find out the progression level of the process. Also, in the case where the progress level of the process increases again by the predetermined update threshold or more within the predetermined reference time period after the number of displayed digits is increased, the preview screen presentation section 52 restores the display to the initial number of digits by reducing the number of displayed digits of the numerical value of the progress level. According to such control over switching between numbers of displayed digits, it is possible to give a detailed guidance regarding the progression level to the user only in the case where the user can make a distinction.

Figure 8:
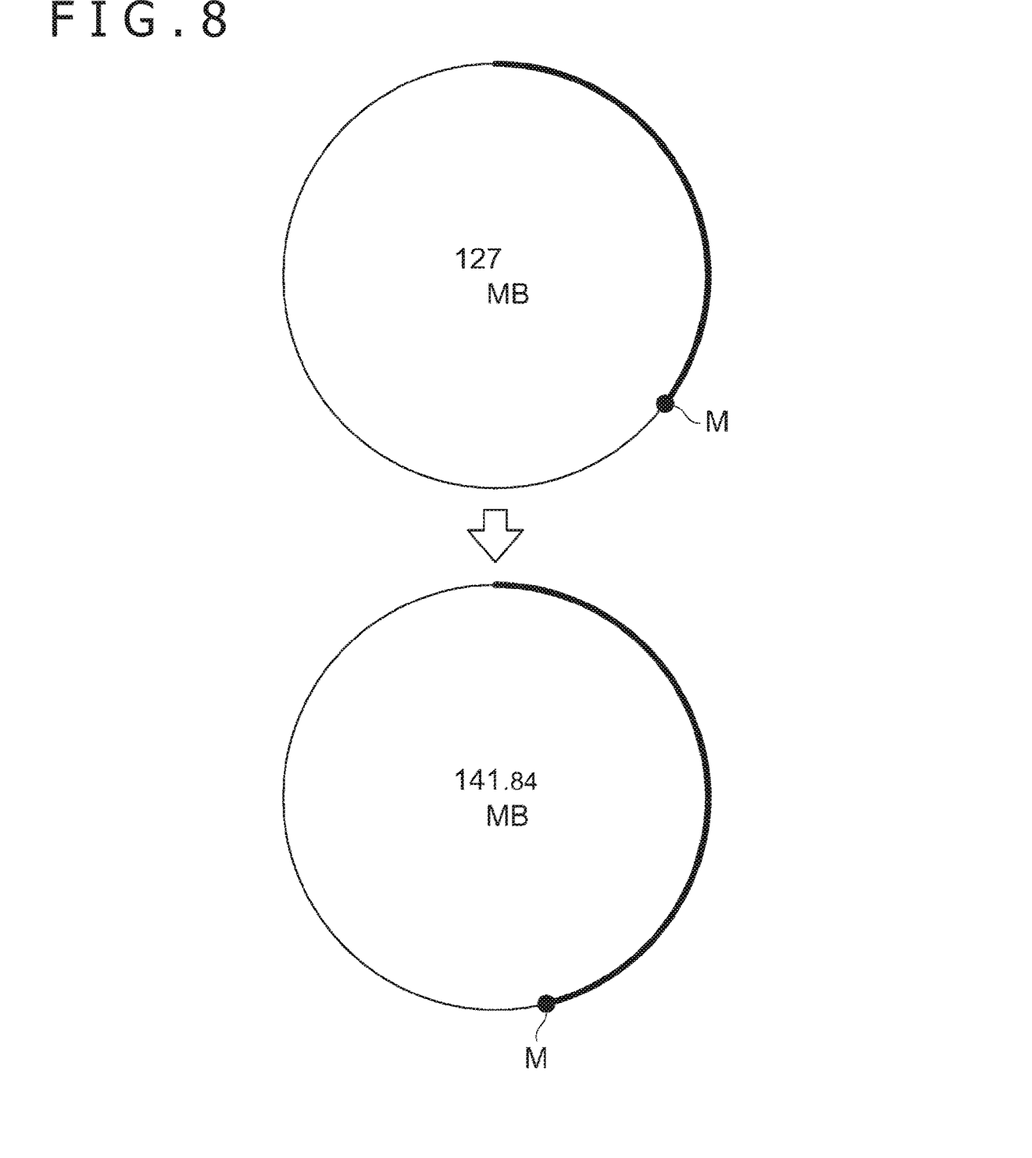
FIG. 8 is a diagram illustrating another example of the progress guidance display.

It should be noted that the progress guidance display is not limited to that illustrated in FIG. 7 and may have a variety of modes including a numerical value of the progress level. FIG. 8 illustrates another example of the progress guidance display. Also, in FIG. 8, an example of a display in a normal state before the number of displayed digits is increased is illustrated at the top, and an example of a display after the number of displayed digits is increased is illustrated at the bottom. Also, in the examples illustrated in FIG. 8, the numerical value of the progress level is indicated by a received data size instead of a ratio (percentage). Further, in this example, displayed is a marker M that moves on a circular route according to the progress level of the process to display the progress level with animation. This marker M starts moving from an upward direction position (12 o'clock position), moves one lap around a circular route as the process proceeds, and returns to the initial 12 o'clock position when the process is complete. Further, the preview screen presentation section 52 may give the user a guidance regarding not only the progress level of the process at that point but also the speed at which the process proceeds at that point, by causing this marker M to flash at a cycle corresponding to the speed at which the process proceeds, for example. This makes it possible for the user to find out not only the progress level of the process but also the speed at which the process proceeds at present. In this case, the cycle may be controlled such that the more slowly the process proceeds, the shorter the cycle is. In the case where a guidance regarding the speed at which the process proceeds is given, it is easy for the user to find out that the progression speed has slowed down, by ensuring that the lower the progression speed is, the more quickly what is displayed changes (the shorter the time intervals for changing what is displayed), compared with the case of controlling the display such that the slower the progression speed is, the less often what is displayed changes. It should be noted that, in the case where the progression speed drops below a given reference value, a display that is distinguishable from other situations, such as a display where the display of the marker M itself is deleted, may be given. This makes it possible to present the user with a situation where the process has come to a halt, in an easy-to-understand manner.

As described above, according to the client apparatus 10 of the embodiment of the present invention, it is possible to more clearly present the user with details presented by content, such as the state of a game being played, by presenting a video representing a screen viewed by another user currently using the content, as the preview screen PS corresponding to each of the content options C when the content selection screen CS that receives a selection of the content option C is presented. This makes it easier for the user to select desired content.

It should be noted that embodiments of the present invention are not limited to the embodiment described above. In the description given above, for example, a layout of the content selection screen CS or the preview screen PS and what is displayed on the content selection screen CS or the preview screen PS are both merely illustrative.

Also, at least some of the processes performed by the server apparatus 20 as described above may be performed by the client apparatus 10. For example, the client apparatus 10n may acquire information regarding content currently used by the client apparatus 10 of another user registered in advance, directly from the client apparatus 10 and may present the information as current user information to the user.

Also, the progress guidance display given by the preview screen presentation section 52 during reception of a delivered video image in the description given above is not limited thereto and may be applied to a variety of processes whose progress level is required to be presented to the user.

REFERENCE SIGNS LIST

1: Information processing system
10: Client apparatuses
11: Control section
12: Storage section
13: Interface section
14: Operating device
15: Display apparatus 20: Server apparatus
51: Content selection screen presentation section
52: Preview screen presentation section
53: Content presentation section

The invention claimed is:

1. An information processing apparatus comprising:
a content selection screen presentation section adapted to present a user with a content selection screen including a plurality of types of content options, where the content options are selectable by the user in order to execute such content for viewing by the user, wherein:
(i) each content option, prior to selection and execution, is presented to the user as a respective content image among a plurality of content images,
(ii) each respective content image represents the corresponding content option that is presently being executed by another of a plurality of other users, but is not presently selected or executed by the user, and
(iii) indicia of one or more of the plurality of other users is included in proximity to one or more of the content images; and
a preview screen presentation section adapted to present the user with, in a case where one of the content images is selected while the content selection screen is presented, a preview screen including a video that represents a state of a screen watched by the another user among the plurality of other users who is actually using the selected content option,
wherein a graphical symbol is presented such that the another user is graphically linked to the preview screen showing the selected content image for the corresponding content option, and
wherein the preview screen presentation section displays, when receiving the videos, a numerical value indicating a progress level of the process of receiving the videos.

2. The information processing apparatus according to claim 1, wherein the preview screen presentation section presents a plurality of videos representing states of screens individually watched by the plurality of other users, in such a manner as to associate the plurality of videos with corresponding ones of the user images representing the plurality of other users.

3. The information processing apparatus according to claim 1, wherein, in a case where the numerical value indicating the progress level is not updated for a predetermined time period, the preview screen presentation section increases the number of displayed digits of the numerical value.

4. An information processing system comprising:
a server apparatus; and
a plurality of client apparatuses, wherein
the server apparatus includes
means adapted to receive, from each of the plurality of client apparatuses, information identifying content currently used by the client apparatus, and
at least one of the plurality of client apparatuses includes:
(a) a content selection screen presentation section adapted to present a user with a content selection screen including a plurality of types of content options, where the content options are selectable by the user in order to execute such content for viewing by the user, wherein:
(i) each content option, prior to selection and execution, is presented to the user as a respective content image among a plurality of content images,
(ii) each respective content image represents the corresponding content option that is presently being executed by another of a plurality of other users, but is not presently selected or executed by the user, and
(iii) indicia of one or more of the plurality of other users is included in proximity to one or more of the content images; and
(b) a preview screen presentation section adapted to present the user with, in a case where one of the content images is selected while the content selection screen is presented, a preview screen including a video that represents a state of a screen watched by the another user among the plurality of other users who is actually using the selected content option,
wherein a graphical symbol is presented such that the another user is graphically linked to the preview screen showing the selected content image for the corresponding content option, and
wherein the preview screen presentation section displays, when receiving the videos, a numerical value indicating a progress level of the process of receiving the videos.

5. An information processing method comprising:
presenting a user with a content selection screen including a plurality of types of content options, where the content options are selectable by the user in order to execute such content for viewing by the user, wherein:
(i) each content option, prior to selection and execution, is presented to the user as a respective content image among a plurality of content images,
(ii) each respective content image represents the corresponding content option that is presently being executed by another of a plurality of other users, but is not presently selected or executed by the user, and
(iii) indicia of one or more of the plurality of other users is included in proximity to one or more of the content images; and
presenting the user with, in a case where one of the content images is selected while the content selection screen is presented, a preview screen including a video that represents a state of a screen watched by the another user among the plurality of other users who is actually using the selected content option,
wherein a graphical symbol is presented such that the another user is graphically linked to the preview screen showing the selected content image for the corresponding content option, and
wherein the preview screen presentation section displays, when receiving the videos, a numerical value indicating a progress level of the process of receiving the videos.

6. A non-transitory, computer readable storage medium containing a computer program, which when executed by a computer, causes the computer to perform an information processing method by carrying out actions, comprising:
presenting a user with a content selection screen including a plurality of types of content options, where the content options are selectable by the user in order to execute such content for viewing by the user, wherein:
(i) each content option, prior to selection and execution, is presented to the user as a respective content image among a plurality of content images,
(ii) each respective content image represents the corresponding content option that is presently being executed by another of a plurality of other users, but is not presently selected or executed by the user, and
(iii) indicia of one or more of the plurality of other users is included in proximity to one or more of the content images; and
presenting the user with, in a case where one of the content images is selected while the content selection screen is presented, a preview screen including a video that represents a state of a screen watched by the another user among the plurality of other users who is actually using the selected content option, wherein a graphical symbol is presented such that the another user is graphically linked to the preview screen showing the selected content image for the corresponding content option, and wherein the preview screen presentation section displays, when receiving the videos, a numerical value indicating a progress level of the process of receiving the videos.

* * * * *